INVENTORS
ROBERT DRAGOON
KARL V. KRASKE
BY Clyde C. Metzger
ATTORNEY

United States Patent Office 3,463,659
Patented Aug. 26, 1969

3,463,659
VACUUM METALLIZED PAPER
Robert Dragoon and Karl V. Kraske, Rumford, Maine, assignors to Oxford Paper Company, Rumford, Maine, a corporation of Maine
Filed Oct. 22, 1965, Ser. No. 500,908
Int. Cl. B44d 1/12; C23c 13/02
U.S. Cl. 117—71                                  8 Claims

ABSTRACT OF THE DISCLOSURE

A metallized paper is prepared by applying to a backing paper sheet a base coat containing about 52 to 88 percent by weight of an inorganic pigment such as clay, calcium carbonate or titanium dioxide, about 2 to 20 percent by weight of a thermoplastic pigment having a glass transition temperature above 150° F. such as a polyvinyl-acetate polymer or a polystyrene emulsion polymer, about 5 to 25 percent by weight of a water or alkali soluble natural polymer adhesive such as starch, casein or protein, supercalendering the coated sheet, applying a lacquer top coat, and vacuum applying a metal such as aluminum, silver, tin, zinc and gold. Additionally a print prime top coat may be applied which may be a lacquer, soft glass, magnesium fluoride and calcium fluoride.

---

Figure 1:
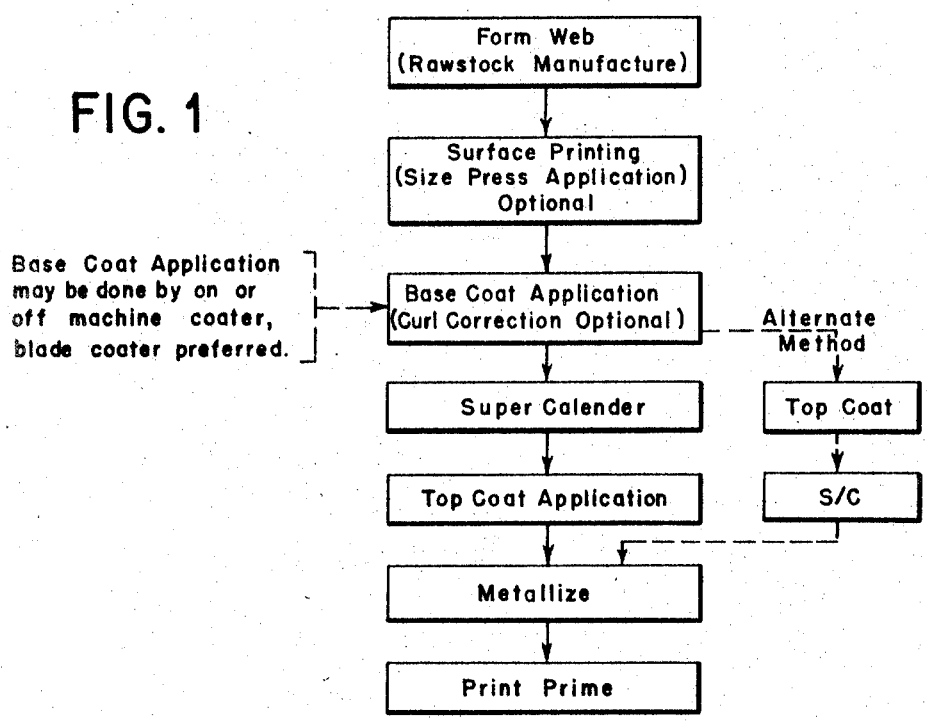

This invention relates to a vacuum metallized paper and more particularly to such metallized paper which is prepared by applying a barrier coat to a web, supercalendering the coated web, applying a continuous top coat to said coated web, vacuum metallizing said top coat, and then print-priming said vacuum metallized surface to form an inexpensive glossy metallized paper which is particularly useful in the decorative labeling and packaging fields.

In the preparation of metallized paper, it has generally been found necessary to vacuum metallize paper with a metal such as aluminum or zinc but also to perform some additional steps, such as supercalendering or machine finishing, in order to give the metallized surface a glossy appearance. Even with these additional calendering steps, the resulting metallized surface has not always been entirely satisfactory since frequently the metal is not uniform in color, or the metal surface lacks the proper degree of adhesiveness to the underlying base or the surface is not of such nature that it can be readily printed upon. Moreover, methods are known for making a vacuum metallized paper having the metallic luster of an aluminum foil-paper laminate; however, these methods have not been used extensively in industry or commercially successful because of their excessive cost or the metallized paper produced had physical properties unsuited for the intended end use application.

It has now been found that a metallized paper can be made according to the present invention which has physical properties suitable for various uses in industry and which is superior in many applications and less expensive to produce than aluminum foil-paper laminate. The present invention results from an optimum selection and sequence of process steps together with an appropriate selection of materials which produce a smooth brilliant metallized paper having desirable functional characteristics at a low cost. The resulting metallized paper, according to this invention has all the major characteristics required for use in the decorative labelling and packaging fields. These major characteristicvs are listed below with and explanation of their significance and the means used to evaluate the product.

Appearance is the relative pleasingness of the metallized paper to the eye, as compared with aluminum foil-paper laminate. In addition, the smoothness and reflectance of the metallized paper is measured. Smoothness is expressed in terms of angular resolution, i.e., the reflective imaging quality of the surface. The better the resolution, i.e., the smaller the angle. A perfect mirror would have zero angular resolution. Reflectance is determined by measuring the total amount of light reflected from the surface when illuminated by a standard source. The reflectance is expressed as a brightness percentage. Appearance is evaluated on freshly metallized paper and on paper that has been soaked in water and redried.

Metal adhesion is determined by an adhesive tape test, on freshly metallized paper and on paper that has been water soaked and redried. This test yields a realistic evaluation of the metal adhesion and bond strength of the paper. Metal adhesion is rated excellent, good or poor.

Printability is a measure of the ink receptivity, ink adhesion, and print fidelity obtained on printing paper by means of various printing processes. Since metallized paper is primarily a decorative paper, these characteristics (print fidelity, ink adhesion and ink receptivity) must be excellent for this paper to be acceptable. Printability is rated as either satisfactory or unsatisfactory.

Wet rub is a measure of resistance of the paper to handling when it is wet. It is measured by rubbing the wet metallized surface and observing the amount of rubbing action needed to produce failure. Wet rub is rated as excellent, good, or poor.

Dry flexibility is a measure of the resistance of the sheet to folding and creasing. This feature is particularly important in packaging applications where the sheet is folded or crimped by machinery used to wrap certain products. Metallized paper having poor dry flexibility will crack and chips of the coating will flake off corners of packages. Dry flexibility is measured by folding a sample 180° back on itself and then rolling the sheet back and forth on the crease. The sheet is then opened up and the rolled crease examined for visible evidence of cracking and flaking. A sheet showing no signs of fracture is rated excellent where one having a portion of its coating flaked off or removed during the rolling action is rated poor.

Wet flexibility is a measure of the sheet's resistance to cracking and flaking or falling apart when it is folded or creased when wet. This property is evaluated by having the sheet thoroughly soaked in water and tested by the dry flexibility test procedure.

MVTR (flat) is a measure of the resistance of the sheet to the transmission of water vapor on a flat, unfolded, uncreased sheet. This feature is particularly important in packaging applications requiring resistance to water vapor transmission where the package is not creased, bent, or folded. MVTR (flat) is measured by a standard TAPPI test where the results are given in terms of grams of water transmitted through a one hundred square inch area in a 24-hour period at 100° F. and 90% relative humidity.

MVTR (creased) is a measure of the resistance to the water vapor transmission of a sheet that has been folded and creased. This feature is particularly important for barrier paper used in packaging applications such as soap wrap, box wrap, etc. MVTR (creased) is also measured by a standard TAPPI test.

Wet expansivity is a measure of the linear expansion undergone by a sheet when soaked in water. This feature is important where metallized paper is used as labels for bottles which may be soaked in water. Labels are often edge glued on bottles. The glued edges prohibit a uniform uninhibited expansion of the label when it becomes wet. Consequently, the label will cockle or corrugate with the amount of distortion proportional to the wet expansivity of the sheet. A low wet expansivity is desired.

Curl stability is a measure of the resistance of the sheet to curl when it is exposed to widely varying ambient conditions. A sheet that remains flat over a wide range of exposure conditions is rated excellent where an unstable sheet that tends to curl into a tube is rated poor.

Corrosion resistance is a measure of the ability of the metallized paper to retain its color and metal film when immersed in water containing traces of metallic salts. A metallized paper which can withstand five days immersion in water containing metallic salts and show no detectable disturbance of the metal film is rated excellent. A metallized paper showing a detectable, but not appreciable amount of corrosion is rated good, whereas a metallized paper showing a detectable amount of corrosion in one day is rated poor.

Oil resistance is a measure of the ability of the metallized sheet to retain its decorative appeal and other functionality properties when the backside of the sheet is exposed to or immersed in oil. This feature is particularly important where oily materials, e.g., motor oil, are packed in composite cans, in which the inside, i.e., the backside of the sheet might be exposed to oil leaking through the container. A metallized paper which can withstand direct exposure to its backside or contact with oils or greasy materials without losing its bond strength or lacking in appearance is rated excellent.

Basically, the invention is carried out by forming a web or paper substrate on a fourdrinier paper machine; surface priming the web with a size press which is usually attached to the paper machine; filling, smoothing and solvent proofing the surface of this web with a barrier coat; further smoothing, polishing and densifying said barrier coated web by a supercalendering step; applying a glossy continuous film type top coat to said supercalendered barrier coated web; subjecting said top coat to vacuum metallizing with aluminum; and print priming or treating said metallized surface for desired printing characteristics.

The metallized paper of this invention results from a unique combination of interrelated processes and materials. Each process and material effects the ultimate metallized paper, therefore, the interrelationships between the individual processes and properties of materials must be carefully considered to produce metallized paper according to this invention.

Figure 2:
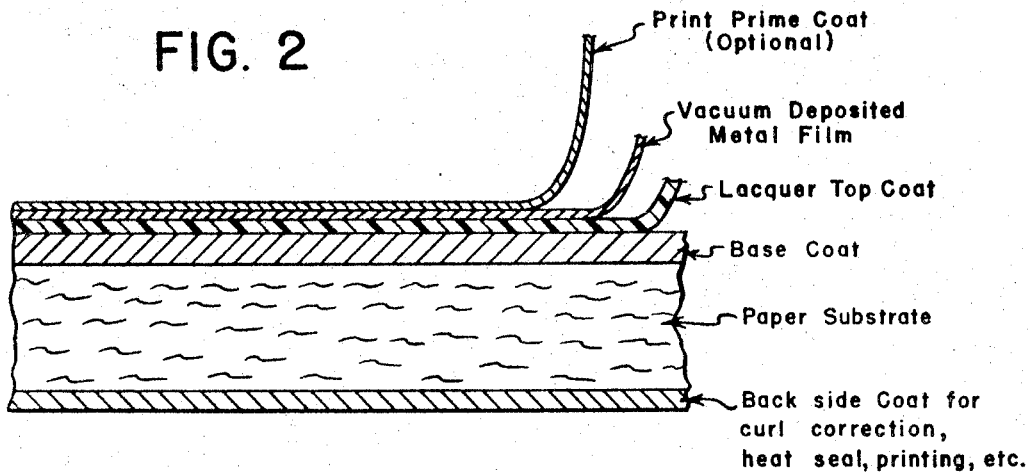

For a detailed description of the various process steps and product components of the metallized paper, and to further point out the features of our invention, attention is directed to the following specification and the accompanying drawings where:

FIGURE 1 is a schematic drawing of the preferred metallized paper production process; and FIGURE 2 is a schematic drawing of the composition of the metallized paper.

The paper web is prepared on a conventional fourdrinier paper machine and when desired the surface of the newly formed web may be primed or sized with a conventional size press which is generally attached to the paper machine. The selection of materials used in the base sheet is usually determined by the metallized paper's end use requirement rather than the specific requirements of the metallizing process. The only base sheet requirements necessary for the metallizing process are that it be strong enough to be handled over the processing equipment and that the sheet be as smooth and uniform as possible. A wide range of substrates or raw stock compositions, which have a basis weight that may be scaled within manufacturing specifications, may be used in this process to satisfy the particular end use requirements. A typical base sheet consists of approximately 30 pounds/ream of fiber including filler. Different amounts of filler may be used to satisfy specific applications.

The base or barrier coat is advantageously applied to the base sheet by a blade coater which produces the smoothest and most level coating. The base coat helps produce a smoother sheet by filling interfiber interstices and retains the more expensive topcoat on the surface permitting the use of low coat weights. During the base coat application, a light coat is applied to the backside of the base sheet for curl correction. It is economically advantageous to combine the formation of the base sheet, the size press treatment and both barrier and curl correction coating operations in one step on the fourdrinier paper machine because of the increase in cost of the additional process step of applying the base and curl correction coatings by an off machine conversion coater.

After the base sheet has been formed and coated, it is supercalendered by conventional paper mill supercalenders in a manner identical to that used for printing papers. Supercalendering smooths the surface of the sheet, compresses or densifies the coating and thereby improves its solvent holdout properties. The type of supercalendering used will determine the smoothness of the final product and with variations of this step the smoothness of the metallized paper can be altered to fully satisfy the needs of a specific application. A premium quality metallized paper having a mirror-like appearance may be produced by using a special high gloss, high temperature chrome roll calender stack. Without the calendering step a brillant metallized paper may be produced, but it will have a rough and textured surface which is not suited for many end use applications.

The supercalendering step may be performed after the topcoat application, however, this procedure is not preferred because it is more economical to have the calendering losses before the less expensive topcoat application. In general, however, the best results are obtained by supercalendering the sheet after the last step when the sheet is wet with water, which is after topcoating when aqueous topcoats are applied and for other methods after barrier or base coating.

The smooth glossy, continuous film topcoat of this invention is advantageously applied to the supercalendered barrier coated substrate by applying a solvent based lacquer coating with a rotogravure coater. The topcoat application, which is the most important single step in the process, determines the usefulness of the final product. Since the surface of the topcoat is to be metallized, it must satisfy the requirements of a metallizing substrate and provide many of the functional qualities desired in the sheet. Moreover, since the vacuum deposited metal layer is very thin (approximately three millionths of an inch) and the resultant metallized surface is an exact replica of the substrate surface, the smoothness, gloss and continuity of the surface of the substrate must be the same as that required in the final product.

Vacuum metallizing techniques are well known and the process of vacuum metallizing is known to be a suitable method for depositing metal on a paper surface by means of condensation from a metal gas or vapor. This method is a dry process which employs a heating source to evaporate the metal, a web handling system to transport the paper through the metal vapor, a pressure vessel where the operation can be performed at low pressures, and a vacuum pumping system to achieve and maintain low pressures. The evacuation of practically all the air molecules between the heating source and substrate is carried out so that the metal particles can be impinged on the substrate at high velocities in order that adequate adhesion and the proper metallurgical properties will result in the metallized paper. The physical characteristics of the coating metal and physical separation or distance between the source of the coating metal and substrate, determine the degree of vacuum required. For aluminum, this pressure must be maintained at about 0.5 microns, (atmospheric pressure is 760,000 microns). Since the low pressure is needed only in the evaporation area, the pressure vessel is compartmentized to reduce the pumping load on the system. The web lead is from the supply roll chamber, through a pressure seal into the coating chamber, through another seal out of the coating chamber and onto the windup roll in another chamber.

The final step of print priming, which is analogous to the print priming given to foil laminates, prepares the metallized paper for printing by rendering its surface more receptive to printing inks. In one form of this invention, the print priming operation can be accomplished by the application of a shellac coating or a lacquer overcoat. A very thin wash coat of shellac applied from an alcohol solution by a rotagravure coater is adequate for most applications, however, lacquer overcoats are used for applications requiring product proofing or additional barrier properties or colored metallized paper where the lacquer overcoat is colored or dyed. In another form of this invention, print priming is done by vapor which consists of depositing another material such as soft glass, magnesium fluoride, or calcium flouride in vacuum over the freshly deposited metal layer in tandem with the metallizing step. This approach is the most economical since it eliminates the separate print priming step.

The base coat employed in this invention helps smooth and cover the base sheet and minimizes the amount of more expensive topcoat required by holding said topcoat on its surface. The preferred topcoat being a resinous material dissolved in solvent requires the base coat to have excellent holdout characteristics for the particular solvent used. The dried base coat formulations preferred contain about 52% to 88% by weight of inorganic coating a pigment and from about 2% to 20% by weight of a thermoplastic pigment and from about 5% to 25% by weight of a synthetic emulsion polymer adhesive and from about 5% to 25% by weight of a water or alkali soluble natural polymer adhesive. An inorganic coating pigment such as a coating grade clay, is preferred, however other coating pigments such as calcium carbonate or titanium dioxide can be used. The thermoplastic pigment may be a hard polyvinyl-acetate multipolymer, a polystyrene emulsion polymer, or other emulsion polymers so long as they do not interfere with the desired properties of the base coat. The thermoplastic pigment has a glass transition temperature above about 150° F., which is above the effective operating temperature encountered on conventional paper making equipment. The synthetic emulsion polymer adhesive may be a 60–40 styrene-butadiene polymer emulsion, an acrylic emulsion polymer such as ethyl acrylate, or other acrylic emulsion polymers. The synthetic emulsion polymer adhesive should have a glass transition temperature below about 70° F., but for the paper coating adhesives of this invention, the glass transition temperature may be less than about 0° F. The natural water or alkali soluble polymer adhesives include inexpensive materials such as starch, casein, and protein, common to the art of paper coating, and their derivatives.

A variance from the preferred ranges, defined above, for the material content of the base coat is critical, in that undersired results are obtained. A reduction of the thermoplastic pigment content below the preferred range reduces the solvent holdout qualities of the coating, and substantially increases the amount of topcoat, or supercalendering, or adhesive content or combination thereof that is required to obtain the quality level produced by the amount of thermoplastic pigment corresponding to this invention. An increase in the thermoplastic pigment content above the preferred range results in an excessive base coat cost and the coating mixture lacks the desired high solids concentration. A reduction of the overall adhesive level (sum of natural and synthetic polymer adhesives) below the preferred range reduces the solvent holdout characteristics and reduces the product appearance and bond strength of the sheet. An increase in the overall adhesive level results in a higher cost and inability to control the solids concentration and rheological properties of the coating mixture. A reduction of the synthetic polymer adhesive below the preferred range results in a loss of flexibility of the final product. An increase in the amount of synthetic polymer adhesive is undesired because of high cost, adverse rheological properties and the coated sheet tends to be tacky at elevated temperatures. Optimum results are obtained when the base coat is applied at the highest possible solids content and a coat weight from about 3 to 15 pounds per 3,300 sq. ft. per ream. Coat weights below this range do not produce the desired results while coat weights above this range are economically prohibitive.

The preferred curl correction coating, which is applied to the back side of the base sheet, is a light application of clear starch. Materials such as protein, casein, PVA (polyvinyl acetate), and synthetic latices or combinations thereof may also be used for a curl correction coating. Coatings providing some other function in addition to curl correction may be applied to the back side of the base sheet such as conventional-clay adhesive coating where the back side of the sheet is to be printed.

The topcoat which is applied to the supercalendered barrier coated base sheet is usually a solvent based lacquer type coating, which may be one of the various oil modified alkyd compositions cross-linked with an amino-formaldehyde condensate. Solvent based coatings, of this nature, do not affect the fibers in the sheet in any significant way and do not detract from the smoothing effect of the previous calendering step. Therefore, it is preferred to apply the topcoat to a precalendered sheet because calendering losses cost less after the base coat application than after the more expensive topcoat application. The lacquer topcoat constitutes the most important single component in making metallized paper, but a smooth base sheet and base coating with the proper holdout characteristics are essential to fully realize the inherent capabilities of the lacquer coating. The lacquer topcoat must satisfy the requirements for the vacuum deposition process and provide the mechanism for building into the sheet physical characteristics that result in a final sheet having the desired characteristics of good appearance, excellent metal adhesion, satisfactory printability, excellent wet rub, excellent dry flexibility, excellent wet flexibility, a flat-MVTR of 0.1 grams per 100 sq. in. per 24 hours at 100° F. and 90% RH, a creased-MVTR of 3 to 4 grams per 100 sq. in. per 24 hours at 100° F. and 90% RH, low wet expansivity, excellent curl stability, corrosion resistance, and oil resistance.

In vacuum metallizing, where the metal is vaporized and deposited on the substrate, aluminum is particularly well suited for this invention, but other metals such as silver, tin, zinc, or gold may also be used. The nominal thickness of the metal is about 3 millionths of an inch. The metal film improves the MVTR (flat and creased) of the substrate by nearly an order of magnitude and directly affects the final product.

The print prime coat, which is applied over the metallized surface to enhance the printing characteristics of the final sheet, is a light wash coat of shellac or other lacquer type material. A very small amount of shellac from a dilute alcohol solution is usually applied to the metallized surface for print priming. In end use applications requiring both print priming and coloring or special product proofing, a vinyl or nitrocellulose lacquer coating replaces the shellac.

Print priming may also be obtained by vapor depositing another material such as soft glass, magnesium fluoride, or calcium fluoride in vacuum over the freshly deposited metal layer in tandem with the metallizing step. Print priming by this method eliminates the need for a separate conversion step with a substantial reduction in cost. Other materials may be used for vapor print priming and this invention is not limited to those materials specifically mentioned.

The following examples illustrate in more detail various embodiments of the invention.

Example 1

A paper base sheet is made on a fourdrinier paper machine with its surface primed by a size press on said paper machine. The base sheet has a basis weight of 30 lbs. per 3,300 sq. ft. per ream. To the front side of this base sheet, a base coat is applied with a blade coater. The base coat consists of 70% by weight of a coating grade clay, 7% of a thermoplastic pigment (polystyrene), 11½% of a synthetic emulsion polymer adhesive (carboxylated 60-40 polystyrene-butadiene copolymer), and 11½% of a water soluble natural polymer adhesive (enzyme modified starch). In tandem with the base coat, the back side of the base sheet is coated with a light application of clear starch for curl correction.

The resulting coated base sheet is then smoothed on a conventional papermill super calender. Then a continuous film of a solvent based lacquer, having a basis weight of 2 lbs. per 3,300 sq. ft. per ream, is applied to the supercalendered base coated base sheet by a rotogravure coater and smoothed by a metal roll.

This smooth, continuous film topcoat is then coated with aluminum by vacuum deposition whereby the aluminum is heated, evaporated and allowed to condense on the surface of the topcoat. Finally, the metallized surface is print primed with a very thin wash coat of shellac applied from an alcohol solution by a rotogravure center. The resulting metallized paper is a smooth brilliant metallized paper having excellent metal adhesion, satisfactory printability, excellent wet rub resistance, excellent dry and wet flexibility, a flat-MVTR of 0.1 gram per 100 sq. in. per 24 hours at 100° F. and 90 RH, a creased-MVTR of 3 to 4 grams per 100 sq. in. per 24 hours at 100° F. and 90% RH, low wet expansivity, excellent curl stability, and excellent corrosion and oil resistance.

Example 2

The procedure of Example 1 is followed except that (a) the formation of the sheet, (b) the size press treatment, and (c) both the base and curl correction coating operations are combined in one step on the fourdrinier paper machine. The results were similar to those obtained in Example 1.

Example 3

The procedure of Example 1 is followed execpt that the supercalendering step is performed with a special high gloss, high temperature chrome roll calender stack. The results were similar to those obtained in Example 1 and the metallized paper was of premium quality.

Example 4

The procedure of Example 1 is followed except that the metallized surface is print primed by vapor depositing soft glass in vacuum over the freshly deposited metal layer, in tandem with the metallizing step, instead of with a very thin wash coat of shellac applied from an alcohol solution by a rotogravure coater. The reuslts were similar to those obtained in Example 1.

Example 5

The procedure of Example 1 is followed except that the metallized surface is print primed by applying a colored lacquer coating over the freshly deposited metal layer, instead of a very thin wash coat of shellac applied from an alcohol solution. The results were similar to those of Example 1 and the metallized paper was colored and had greater resistance to corrosion.

We claim:
1. A metallized paper comprising:
  (a) a supercalendered paper web coated with a base coat containing about 52% to 88% by weight of an inorganic pigment, about 2% to 20% by weight of a thermoplastic pigment having a glass transition temperature above about 150° F., about 5% to 25% by weight of a synthetic emulsion polymer adhesive having a glass transition temperature below about 70° F., and about 5% to 25% of a water soluble natural polymer adhesive,
  (b) a glossy organic polymeric continuous solvent based top coat adhered to said base coated web, and
  (c) adhered to said top coat, a metal surface print primed with a coat of shellac.

2. The metallized paper of claim 1 in which the metal is selected from a group consisting of aluminum, silver, tin, zinc and gold.

3. A metallized paper comprising:
  (a) supercalendered paper web coated with a base coat containing about 52% to 88% by weight of an inorganic pigment, about 2% to 20% by weight of a thermoplastic pigment having a glass transition temperature above about 150 F., about 5% to 25% by weight of a synthetic emulsion polymer adhesive having a glass transition temperature below about 70° F., and about 5% to 25% of an alkali soluble natural polymer adhesive,
  (b) a glossy organic polymeric continuous solvent based top coat adhered to said base coated web, and
  (c) adhered to said top coat, a metal surface print primed with a lacquer coating.

4. A metalized paper comprising:
  (a) supercalendered paper web coated with a base coat containing about 52% to 88% by weight of an inorganic pigment, about 2% to 20% by weight of a thermoplastic pigment having a glass transition temperature above about 150° F., about 5% to 25% by weight of a synthetic emulsion polymer adhesive having a glass transition temperature below about 70° F., and about 5% to 25% of an alkali soluble natural polymer adhesive,
  (b) a glossy organic polymeric continuous solvent based top coat adhered to said base coated web, and
  (c) adhered to said top coat, a metal surface print primed by a material selected from the group consisting of soft glass, magnesium fluoride and calcium fluoride.

5. The process for preparing a glossy metallized paper which comprises:
  (a) applying to a backing paper sheet a base coat containing about 52% to 88% by weight of an inorganic pigment, about 2% to 20% by weight of a thermoplastic pigment having a glass transition temperature above about 150° F., about 5% to 25% by weight of a synthetic emulsion polymer adhesive having a glass transition temperature below about 70° F., and about 5% to 25% by weight of a water soluble natural polymer adhesive,
  (b) supercalendering the coated sheet,
  (c) applying to said supercalendered coated sheet a glossy continuous solvent based lacquer top coat,
  (d) vacuum metallizing the lacquer top coat with a metal, and
  (e) thereafter print priming said vacuum metallized surface by applying to said metallized surface a coat of shellac.

6. The process of claim 5 in which the metal is selected from a group consisting of aluminum, silver, tin, zinc and gold.

7. The process for preparing a glossy metallized paper which comprises:
  (a) applying to a backing paper sheet a base coat containing about 52% to 88% by weight of an inorganic pigment, about 2% to 20% by weight of a thermoplastic pigment having a glass transition temperature above about 150° F., about 5% to 25% by weight of a synthetic emulsion polymer adhesive having a glass transition temperature below about 70° F., and about 5% to 25% by weight of a water soluble natural polymer adhesive, (b) supercalendering the coated sheet,
(c) applying to said supercalendered coated sheet a glossy continuous solvent based lacquer top coat,
(d) vacuum metallizing the lacquer top coat with a metal, and
(e) thereafter print priming said vacuum metallized surface by applying to said metallized surface a lacquer coating.

8. The process for preparing a glossy metallized paper which comprises:
(a) applying to a backing paper sheet a base coat containing about 52% to 88% by weight of an inorganic pigment, about 2% to 20% by weight of a thermoplastic pigment having a glass transition temperature above about 150° F., about 5% to 25% by weight of a synthetic emulsion polymer adhesive having a glass transition temperature below about 70° F., and about 5% to 25% by weight of a water soluble natural polymer adhesive,
(b) supercalendering the coated sheet,
(c) applying to said supercalendered coated sheet a glossy continuous solvent based lacquer top coat,
(d) vacuum metallizing the lacquer top coat with a metal, and
(e) print priming on said metallized surface in tandem with the metallizing step by vapor depositing a material selected from the group consisting of soft glass, magnesium, magnesium fluoride and calcium fluoride.

References Cited
UNITED STATES PATENTS

| | | | |
|---|---|---|---|
| 2,971,862 | 2/1961 | Baer et al. | 117—61 |
| 3,020,176 | 2/1962 | Robinson et al. | 117—155 |
| 3,047,427 | 7/1962 | Dratz | 117—155 |
| 3,113,888 | 12/1963 | Gold et al. | 117—71 |

ANDREW G. GOLIAN, Primary Examiner

U.S. Cl. X.R.

117—72, 76, 81, 91, 106, 107, 155, 156, 157